June 19, 1923.  E. G. BENDER ET AL  1,459,353
EYE TESTING DEVICE
Filed Sept. 22, 1919
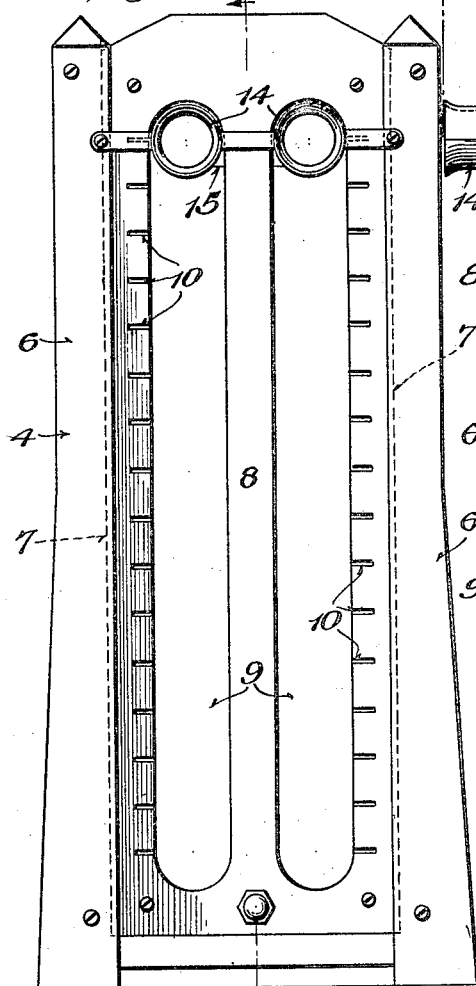
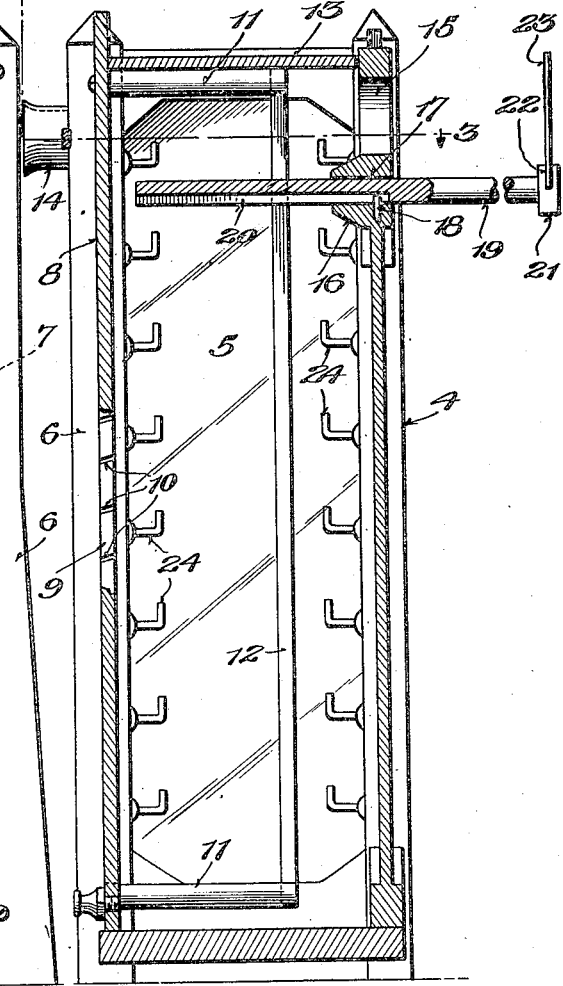
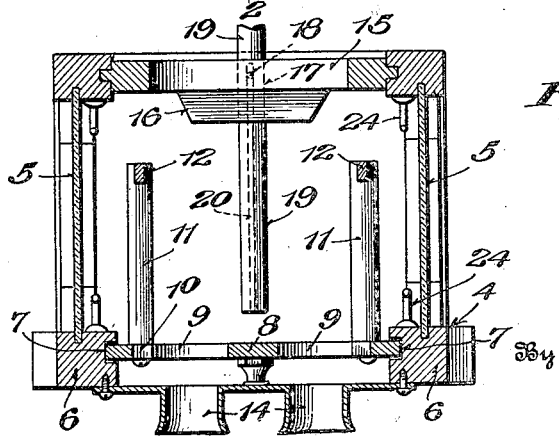
Inventors
Ernest G. Bender,
Louis F. Grab,
By Royal E. Burnham,
Attorney Patented June 19, 1923.

1,459,353

UNITED STATES PATENT OFFICE.

ERNEST G. BENDER AND LOUIS F. GRAF, OF INDEPENDENCE, IOWA, ASSIGNORS TO ROY A. COOK, OF INDEPENDENCE, IOWA.

EYE-TESTING DEVICE.

Application filed September 22, 1919. Serial No. 325,324.

*To all whom it may concern:*

Be it known that we, ERNEST G. BENDER and LOUIS F. GRAF, citizens of the United States of America, residing at Independence, in the county of Buchanan, and State of Iowa, have invented certain new and useful Improvements in Eye-Testing Devices, of which the following is a specification.

This invention relates to a device for displaying spectacles and the like, and for use in bringing articles of that kind having lenses of varying characteristics into the line of vision of a person to be fitted with glasses.

It is an object of the invention to construct, form, and arrange a device of that character in such manner that the person desiring glasses may himself use the same to ascertain what lenses are best suited to his needs.

Another object of the invention is to provide reliable means for holding spectacles in place in a frame that serves both for display and trial of such articles.

When read in connection with the description herein, the details of construction and arrangement of parts contemplated by the invention will be apparent from the accompanying drawing, forming part hereof, wherein an embodiment of the invention is disclosed, for purposes of illustration.

While the disclosures herein now are considered to exemplify a preferable embodiment of the invention, it is to be understood that it is not the intention to be limited necessarily thereto in interpretation of the claims, as modifications and adaptations within the limits of the claims can be made without departing from the nature and spirit of the invention.

Like reference-characters refer to corresponding parts in the views of the drawing, of which—

Figure 1 is a front elevation;

Fig. 2 is a vertical sectional view on the line 2—2, Fig. 1; and

Fig. 3 is a horizontal sectional view.

Having more particular reference to the drawing, 4 designates a case, preferably made of wood and rectangular in general outline, arranged to be supported by a table, counter, or other suitable base. The case preferably is formed with glass or other translucent sides 5 to afford illumination to the interior.

The case is open at the front, and it has corner-posts 6 at opposite sides of the front opening in which are oppositely-disposed guideways or slides 7.

A spectacle-carrying frame or member normally closes the front of the case. This member includes a front wall 8 arranged to be received by the guideways 7 and to have vertical movement therein. Two elongated openings 9, of the distance apart of the lenses of the usual run of spectacles, extend vertically of the wall 8. Each of these openings or slots 9 has along its edge adjacent to the margin of wall 8 a series of slits or seats 10 arranged to have the bows of spectacles placed therein, whereby the articles are held in place on the frame in a position for a person to sight through their lenses. Posts or similar members 11 extend rearwardly from the wall 8, one being located at or approximately in each corner, and these members carry uprights or bars 12 in position to have the spectacle-bows engaged thereover, whereby they are held securely in place. The spectacle-carrying frame is provided with a cover 13.

A pair of eye-tubes 14 is secured to the corner-posts 6 near their top, and there is a sight-opening 15 in the rear wall of the case in alinement with the tubes.

A reinforcement or enlargement 16 on the rear wall of the case below the sight-opening 15 has an opening or guideway 17 therethrough, with a pin 18 projecting diametrically therein. The guideway 17 is arranged to receive a shaft 19 and permit its horizontal movement therein, and the shaft has a slot 20 to receive the pin 18, whereby rotation of the shaft is prevented. At its outer end, the shaft carries a cross-piece 21, having its upper horizontal edge portion formed with a slot 22 for receiving and holding a test-card 23.

Hooks or other suitable supporting members 24 may be placed inside of the case to hold spectacles or the like for display.

Spectacles of different characteristics being on the vertically-slidable carrying-frame, a person by imparting movement to the frame may bring any pair of spectacles thereon into alinement with the eye-tubes, and by sighting through them at the test card he may determine which of them, if any, is suitable to his vision. If any are not, other spectacles or the like may be substituted for those on the frame, or another frame carrying articles of different characteristics may be substituted for the one that has been used, and the process continued until articles with suitable lenses are found.

The distance of the test-card from the eyes of the user at the eye-tubes may be altered to suit varying requirements by sliding the shaft 19 in the guideway 17, and the pin 18 and slot 20 will maintain the card in upright position by preventing rotary movement of the shaft.

The construction and arrangement of the device is such that the actual spectacle or the like that a person that tests his own eyes will require are used in the tests, thus avoiding liability of mistake in obtaining correct lenses such as may occur when irremovable lenses for test purposes are used and other lenses furnished that are supposed to correspond exactly therewith. Moreover, it is unnecessary to handle the articles during their inspection and trial, and thus they do not become finger-marked, infected, or injured in any way. Further, in view of the fact that the articles are themselves made available for test purposes by this device, a dealer is saved the expense of carrying in stock the large number of separate lenses ordinarily required for eye-testing purposes. In addition, as any desired or required number of carrying-frames suitable for use in the device may be kept on hand, those frames may be used separately from the device for holding and displaying the articles in show-windows, counter-cases, on shelves, and elsewhere, from which positions they may be taken at any time for test in the device.

Having thus described our invention, what we claim as new, and desire to secure by Letters Patent, is—

1. A carrying member for spectacles and the like comprising a wall having two vertically-disposed separated openings therein, each of the opposite edges of the openings having a series of seats to receive spectacle-bows, oppositely-disposed posts extending rearwardly from upper and lower portions of said wall, and upright bars carried by said posts, each of said bars being located substantially in alinement with a series of said seats and being arranged to be engaged by curved ear portions of bows engaged in said seats.

2. A device of the kind described comprising a case with a vertical opening having a guideway at each vertical side thereof, and a member slidable in said guideways and arranged to afford a sole carrying means of a plurality of spectacles in the device, said member comprising a wall having two vertically-disposed separated openings therein, each of the opposite edges of the openings having a series of seats to receive spectacle-bows, oppositely-disposed posts extending rearwardly from upper and lower portions of said wall, and upright bars carried by said posts, each of said bars being located substantially in alinement with a series of said seats and being arranged to be engaged by curved ear portions of bows engaged in said seats.

In testimony whereof, we affix our signatures.

ERNEST G. BENDER.
LOUIS F. GRAF.